United States Patent
Triplett et al.

(10) Patent No.: US 12,014,377 B2
(45) Date of Patent: *Jun. 18, 2024

(54) METHODS AND APPARATUS TO SECURELY HANDLE CHIP CARDS

(71) Applicant: Intel Corporation, Santa Clara, CA (US)

(72) Inventors: Josh Triplett, Hillsboro, OR (US); Philip Hanson, Hillsboro, OR (US); Justin Moore, Milwaukie, OR (US)

(73) Assignee: INTEL CORPORATION, Santa Clara, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 17/516,380

(22) Filed: Nov. 1, 2021

(65) Prior Publication Data

US 2022/0058650 A1 Feb. 24, 2022

Related U.S. Application Data

(63) Continuation of application No. 15/812,614, filed on Nov. 14, 2017, now Pat. No. 11,164,188.

(51) Int. Cl.
*G06Q 20/40* (2012.01)
*G06F 9/54* (2006.01)
*G06Q 20/12* (2012.01)
*G06Q 20/20* (2012.01)
*G06Q 20/34* (2012.01)

(52) U.S. Cl.
CPC ............ *G06Q 20/409* (2013.01); *G06F 9/54* (2013.01); *G06Q 20/12* (2013.01); *G06Q 20/341* (2013.01); *G06Q 20/204* (2013.01)

(58) Field of Classification Search
CPC ...... G06Q 20/12; G06Q 20/341; G06Q 20/204
See application file for complete search history.

(56) References Cited

U.S. PATENT DOCUMENTS 9,584,517 B1 2/2017 Roth et al.
10,505,917 B2 * 12/2019 Chhabra ............... H04L 63/061
(Continued)

OTHER PUBLICATIONS

Chip Shield, "Chip Shield Card Reader," retrieved from http://www.chipshield.com/chip-shield-device/ on Oct. 9, 2017, 4 pages.
(Continued)

*Primary Examiner* — Scott S Trotter
*Assistant Examiner* — William D Newlon
(74) *Attorney, Agent, or Firm* — HANLEY, FLIGHT & ZIMMERMAN, LLC

(57) ABSTRACT

Methods, apparatus, systems and articles of manufacture to securely handle chip card data are disclosed. An example method includes providing, by executing an instruction with a first processor of a client device, an application programming interface (API) in a web client of the client device, in response to detecting, in the web client at the client device, a query from a server for card data, operating, by executing an instruction with the first processor of the client device, the API in the web client at the client device to obtain the card data stored on a chip of a chip card communicatively coupled to the client device, and sending, by executing an instruction with the first processor of the client device, the card data to the server.

20 Claims, 10 Drawing Sheets

(56) References Cited

U.S. PATENT DOCUMENTS

| | | | |
|---|---|---|---|
| 10,699,277 B2* | 6/2020 | Smets | G06Q 20/3574 |
| 11,080,674 B1* | 8/2021 | Chen | G06Q 20/341 |
| 11,164,188 B2 | 11/2021 | Triplett et al. | |
| 2002/0133467 A1* | 9/2002 | Hobson | G06Q 20/04 |
| | | | 705/64 |
| 2009/0064301 A1 | 3/2009 | Sachdeva et al. | |
| 2013/0211938 A1 | 8/2013 | Allaqaband | |
| 2014/0172596 A1 | 6/2014 | Ten Cate | |
| 2016/0364723 A1 | 12/2016 | Reese et al. | |
| 2017/0300909 A1 | 10/2017 | Bansal et al. | |
| 2018/0018661 A1 | 1/2018 | Murphy | |
| 2018/0114012 A1* | 4/2018 | Sood | G06F 21/79 |
| 2019/0034928 A1 | 1/2019 | Triplett et al. | |

OTHER PUBLICATIONS

Chip Shield, "Chip Shield Paymment Manager," retrieved from http://www.chipshield.com/web-assistant on Oct. 9, 2017, 5 pages.

Chip Shield, "Introducing Chip Shield: At-Home Chip Card Reader for Online Payment & Identity Security," retrieved from http://www.chipshield.com on Oct. 9, 2017, 5 pages.

European Patent Office, "Online Fee Payment: User Guide," published Mar. 13, 2017, 43 pages.

European Patent Office, "EPO Online Filing: User Guide," published Mar. 31, 2017, 442 pages.

Chip Shield, "Online Shopping Direct to Gateway Encryption," retrieved from http://www.chipshield.com/direct-to-gateway-encryption/ on Oct. 9, 2017, 3 pages.

United States Patent and Trademark Office, "Non-Final Office Action, " mailed in connection with U.S. Appl. No. 15/812,614, on Jun. 7, 2019, 14 pages.

United States Patent and Trademark Office, "Final Office Action," mailed in connection with U.S. Appl. No. 15/812,614, on Nov. 29, 2019, 18 pages.

United States Patent and Trademark Office, "Non-Final Office Action," mailed in connection with U.S. Appl. No. 15/812,614, on Apr. 30, 2020, 18 pages.

United States Patent and Trademark Office, "Final Office Action", mailed in connection with U.S. Appl. No. 15/812,614, on Dec. 10, 2020, 20 pages.

United States Patent and Trademark Office, "Notice of Allowance," mailed in connection with U.S. Appl. No. 15/812,614, on Sep. 13, 2021, 12 pages.

* cited by examiner

METHODS AND APPARATUS TO SECURELY HANDLE CHIP CARDS

RELATED APPLICATION(S)

This patent arises from a continuation of U.S. patent application Ser. No. 15/812,614 (now U.S. Pat. No. 11,614,188), filed on Nov. 14, 2017, and titled METHODS AND APPARATUS TO SECURELY HANDLE CHIP CARDS." U.S. patent application Ser. No. 15/812,614 is incorporated herein by reference in its entirety. Priority to U.S. patent application Ser. No. 15/812,614 is hereby claimed.

FIELD OF THE DISCLOSURE

This disclosure relates generally to chip cards, and, more particularly, to methods and apparatus to securely handle chip cards.

BACKGROUND

In recent years, people are increasingly shopping electronically from their computers, tablets, smart phones, etc. rather than visiting brick and mortar retailers. In many instances, they visit electronic commerce (a.k.a. e-commerce) web sites to make such purchases.

Figure 1:
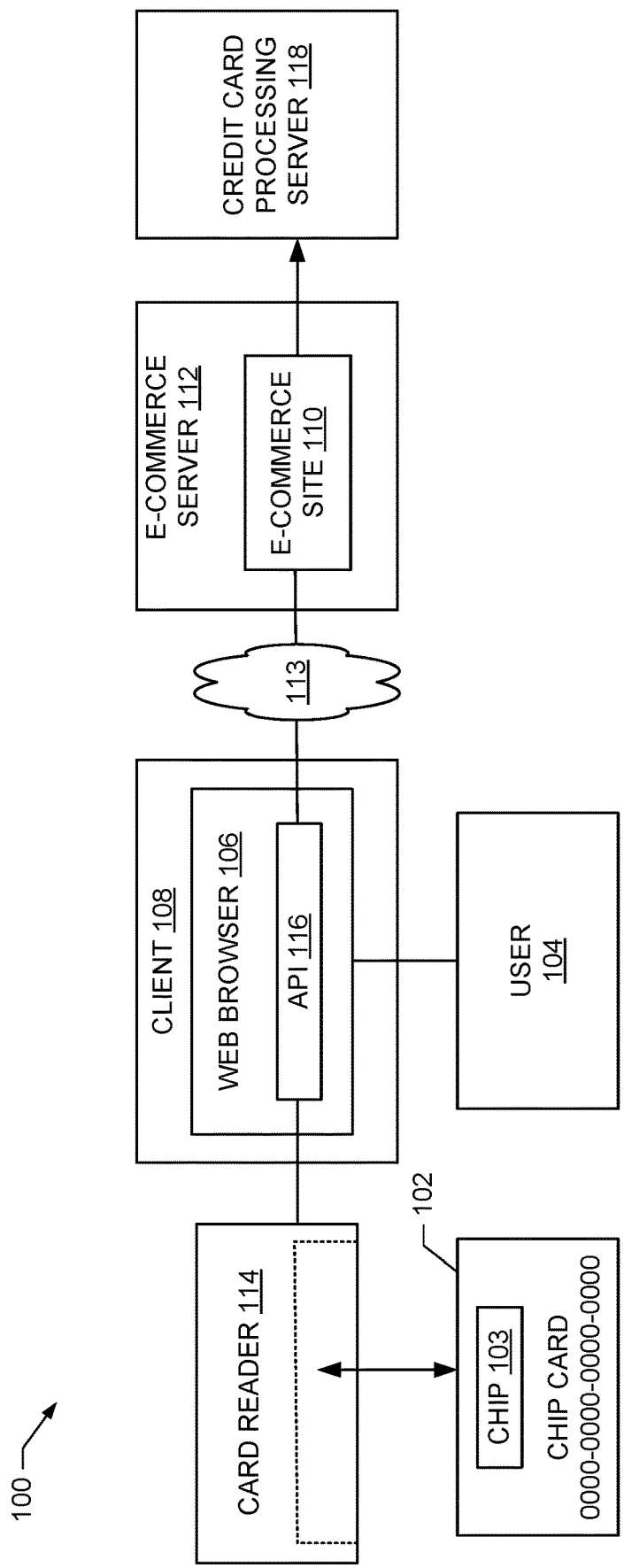
FIG. 1 illustrates an example environment in which a chip card is securely handled, in accordance with this disclosure.

Wherever possible, the same reference numbers will be used throughout the drawing(s) and accompanying written description to refer to the same or like parts. Connecting lines, connections and connectors shown in the various figures presented are intended to represent example functional relationships, physical couplings and/or logical couplings between the various elements.

DETAILED DESCRIPTION

Today, most e-commerce transactions (e.g., those made using a web site, a retail shopping application (e.g., a custom application for an IOS™ device, an ANDROID™ device, etc.)) involve manual entry of credit card data or information (e.g., an account number, an expiration date, a verification code, etc.), or custom proprietary payment information. Because the credit card data is manually entered, these types of transactions are considered more likely to be fraudulent. Current e-commerce transactions may also be vulnerable to local malware on a client device.

A chip card is a card (e.g., a credit card) of any material (e.g., plastic, paperboard, etc.), shape or size that has an integrated circuit (IC) chip, or just chip, on, or at least partially embedded in the card that securely stores data. In some examples, a chip card is physically inserted into a device having a chip reader that is brought in electrical contact with exposed contacts of the chip when the chip card is inserted. In some examples, a wireless or contactless card can be read over a short distance using, for example, radio-frequency identification (RFID), near field communication (NFC), etc. technology. Both electrically readable, and wireless cards can be used with the examples disclosed herein. Chip cards are also sometimes referred to as smart payment cards, chip and pin cards, chip-enabled credit cards, etc. Chip cards for any number of applications may be implemented using the examples disclosed herein. Thus, the following disclosure will refer simply to chip cards. Moreover, while examples disclosed herein refer to credit card data, any type or amount of data may be stored on a chip card together with the examples disclosed herein. In some examples, the chip is an EMV (Europay, MASTERCARD®, and VISA®) chip.

Today, chip card readers are integrated into purpose-built point-of-sale (POS) devices used by businesses such as retail stores, restaurants, offices, kiosks, gas stations, etc. The cost and complexity of buying, installing and maintaining such purpose-built POS devices by individuals renders them impractical as devices used by individuals for personal use. The examples disclosed herein make the personal use of chip cards, and chip card readers by consumers cost effective and practical. In disclosed examples, readily available consumer devices (e.g., a computer, a smartphone, a tablet, etc.) implement a web-based application programming interface (API) in a web browser that integrates simple, consumer-friendly chip card readers with the consumer device. By allowing the use of physical chip cards, the example APIs disclosed herein provide a simple and secure method for using chip-verified credit card transactions via the web. The disclosed example APIs allow credit card processors to securely verify credit card data as they do for traditional transactions in which a card is physically present (a.k.a. "card present" transactions), thereby eliminating the fraud risk associated with transactions in which a card is not physically present (a.k.a. "card not present" transactions). Disclosed example APIs provide a secure channel to verify a physically present credit card via the hardware security chip present in most modern chip credit cards.

Moreover, in some current solutions, a third-party operates between a user's client device and merchants (e.g., e-commerce servers) and/or banks (e.g., credit card processor). Such intermediary or man-in-the middle solutions require that end-users, merchants, and banks trust the third-party with their confidential or sensitive data. Moreover, third-parties may not support all merchants and banks, thus, limiting the use of the third-party's services. In stark contrast, the examples disclosed herein allow merchants and banks to interact with the chip on a chip-card, thus obviating the need for or risks associated with the involvement of a third-party. Instead, a user uses the merchant's or the bank's own web site to pay for goods, allowing the merchant and bank to control the user experience, and security. Further, because the disclosed web-based APIs allow merchants and banks to interact with the chip on a chip-card, the APIs provide a ready and open solution that can be easily, widely and rapidly implemented in the e-commerce marketplace.

The web-based APIs disclosed herein provide an open solution, compared to current proprietary payment systems, and card scanning via NFC or a card reader improves user convenience compared to manual card number entry. In some examples, the web-based APIs trigger secure code execution domains (a.k.a. secure enclaves) on a client, and an e-commerce site or credit card processor server, which establish an end-to-end secure communication channel between them to further enhance security. In some examples, secure enclaves and secure communication channels enable a credit-card processor to directly provide and/or verify a person's personal information (name, phone number, billing/shipping address, etc.). While references are made herein to example web browsers, any number and/or type(s) of examples of, more generally, web clients, web devices, etc. may be used herein to implement disclosed web-based APIs. In some examples, a web client is an application (e.g., a program, a utility, a process, etc.) executed on a user's client device (e.g., a computer, a laptop, a smartphone, a tablet, etc.) that communicates with a server (e.g., an e-commerce server, a credit card processing server, a website server, etc.) over a network (e.g., the Internet) using, for example, the hypertext transfer protocol (HTTP), the hypertext transfer protocol secure (HTTPS) protocol, etc. Example web clients include, but are not limited to, the web browsers disclosed herein. In some examples, a web device is a device on which a web client is executed.

Reference will now be made in detail to non-limiting examples of this disclosure, examples of which are illustrated in the accompanying drawings. The examples are described below by referring to the drawings.

FIG. 1 illustrates an example environment 100 in which a chip card 102 having a chip 103 is securely handled, in accordance with this disclosure. In the illustrated environment 100, a user 104 uses a web browser 106 executing on a client device 108 to interact with a web site (e.g., an e-commerce site 110) executing on an e-commerce server 112. Example client devices 108 include, but are not limited to, a personal computer, a laptop, a smartphone, a tablet, etc. The example web browser 106 interacts with the e-commerce site 110 via any number and/or type(s) of example public, and/or private network(s) 113 or, more generally, any number and/or type(s) of communicative couplings.

To communicatively couple the chip 103 of the chip card 102 to the client device 108, any type of example card reader 114 compatible with the chip card 102 is communicatively coupled to the client device 108. Example chip card readers 114 are consumer-friendly (e.g., sold retail, etc.) and easily installed to consumer devices via consumer interfaces such as universal serial bus (USB), near field communication (NFC), BLUETOOTH®, etc. In some examples, the chip card reader 114 is part of the client device 108. For example, an NFC sensor built into a smartphone, a laptop, a tablet, etc. In some examples, the chip card reader 114 is communicatively coupled to the chip 103 when the chip card 102 is inserted into the chip card reader 114. In some examples, the chip card reader 114 is communicatively coupled to the chip 103 when the chip card 102 is near enough for, for instance, NFC communications.

To allow the e-commerce site 110 to communicate with the chip 103, the example web browser 106 implements an example API 116. The example API 116 of FIG. 1 presents an interface to the e-commerce site 110 that allows the e-commerce site 110 to interact with the chip 103. For example, the API 116 provides one or more commands that the API 116 carries out on behalf of the e-commerce site 110. The disclosed example API 116 additionally enables the e-commerce site 110 to query the user's web browser 106 for an attached card reader 114 that supports communication with the chip 103 on the chip card 102. In some examples, the example APIs 116, 202 (FIG. 2) and 302 (FIG. 3) are implemented using JAVASCRIPT™.

In some examples, the API 116, 202, 302 enable the e-commerce server 112 and/or the credit card processing server 118 to send an authentication challenge to the chip 103 on the chip card 102, as part of challenge-response authentication. The API 116, 202, 302 responds by sending a corresponding challenge response obtained from the chip 103 to the site 112, 118. More generally, the API 116, 202, 302 establishes, sets up, etc. a secure communication channel between the chip 103 on the chip card 102 and the e-commerce server 112, the credit card processing server 118, and/or the bank/financial institution that issued the chip card 102. In some examples, the API 116, 202, 302 supports retrieval of incidental information associated with a user, either from the chip 103 itself, or stored in the browser 106 and unlocked based on the presence of a specific card. The information provided might differ based on the card presented.

When the e-commerce site 110 needs, for example, credit card data for a transaction, the example e-commerce site 110 of FIG. 1 queries the example API 116 to determine whether the user's web browser 106 and hardware are capable of performing chip-based transactions. If so, and if the card 102 is not detected (e.g., not already inserted, not already brought near, etc.), the user is prompted to insert the card 102 into the card reader 114 or to bring the card 102 near the card reader 114, etc. Once inserted or brought near, the API 116 can obtain credit card data from the card 102, and provide the credit card data to the e-commerce site 110. The e-commerce site 110 uses the provided credit card data to complete the transaction, and reports the transaction to a chip card processing server, such as a credit card processing server 118 (e.g., Visa, Mastercard, Discover, American Express, etc.) for payment.

In some examples, the API 116 verifies the chip 103 and/or the credit card data before it is sent to the e-commerce site 110. In some examples, the e-commerce site 110 performs the verification of the chip 103 and/or the credit card data. Verification may be performed, for example, using any number and/or type(s) of methods applicable to past, present, and/or future chip cards, such a chip and pin, challenge response, etc.

Figure 2:
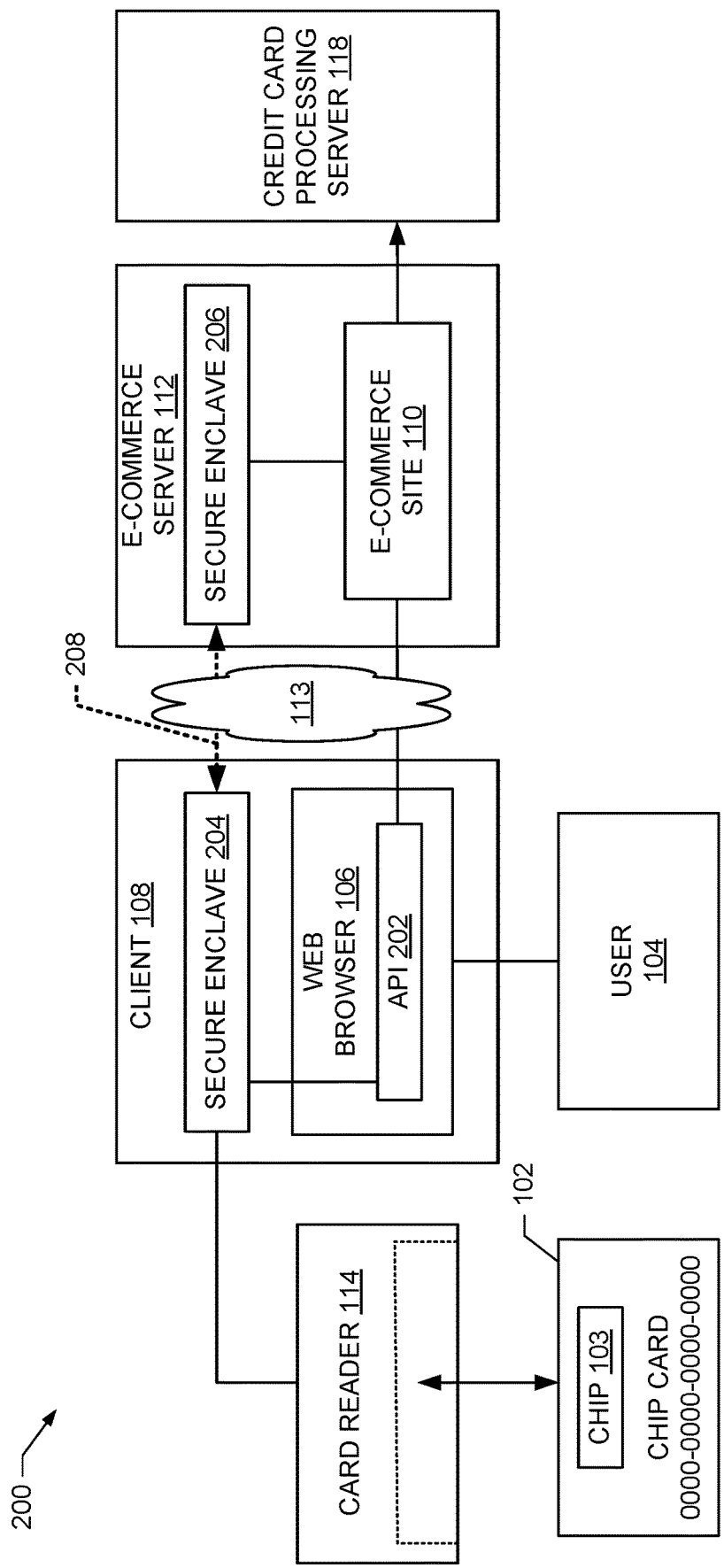
FIG. 2 illustrates another example environment in which a chip card is securely handled, in accordance with this disclosure.

FIG. 2 illustrates another example environment 200 in which the example chip card 102 having the chip 103 is securely handled, in accordance with this disclosure. To allow the e-commerce site 110 to communicate with the chip 103, the example web browser 106 implements an example API 202. The example API 202 of FIG. 2 presents an interface to the e-commerce site 110 that allows the e-commerce site 110 to query the user's web browser 106 for an attached card reader 114 that supports communication with the chip 103 on the chip card 102. In some examples, the API 202 additionally enables the e-commerce site 110 to trigger the execution of a secure enclave 204 at the client device 108 that interacts with a secure enclave 206 at the e-commerce server 112 over a secure communication link 208, which the API 202 establishes between the secure enclaves 204, 206 by tunneling the communication link securely through a less secure link (e.g. one not trusted by the enclaves). The secure enclave 204 at the client device 108 executes an interface that enables the secure enclave 206 at the e-commerce server 112 to securely interact with the chip 103 over the secure communication link 208. In some examples, the secure enclaves 204, 206, 304 and 306 (FIG. 3) disclosed herein are implemented using INTEL® Software Guard Extensions (SGX). In some examples, the example secure communication links 208 and 308 (FIG. 3) are encrypted communication links.

In some examples, the interface provided by the secure enclaves 204 (FIG. 2), 304 (FIG. 3) enables the secure enclave 206 (FIG. 2), 306 (FIG. 3) at the site 112, 118 to issue a verification challenge to the chip 103 on the chip card 102, as part of challenge-response authentication. The secure enclave 204, 304 responds by sending a corresponding challenge response obtained from the chip 103 to the site 112, 118. In some examples, the secure enclave 206 on the e-commerce site 112 provides an attestation to the credit card processing server 118 that is verifiable by the credit card processing server 118.

When the e-commerce site 110 needs, for example, credit card data for a transaction, the example e-commerce site 110 of FIG. 1 queries the example API 202 to determine whether the user's web browser 106 and hardware are capable of performing chip-based transactions. If so, and if the card 102 is not already inserted or has not already been brought near, the user is prompted to insert the card 102 into the card reader 114, or bring it near the card reader 114, etc. Once inserted or brought near, the API 202 initiates the secure enclave 204 at the client device 108. The secure enclave 206 at the e-commerce server 112 interacts with the secure enclave 204 at the client device 108 to obtain the credit card data from the chip 103. The e-commerce site 110 uses the obtained credit card data to complete the transaction, and reports the transaction to a credit card processing server 118 (e.g., Visa, Mastercard, Discover, American Express, etc.) for payment.

In some examples, the secure enclave 204 verifies the chip 103 and/or the credit card data before it is sent to the secure enclave 206. In some examples, the secure enclave 206 performs the verification of the chip 103 and/or the credit card data. Verification may be performed, for example, using any number and/or type(s) of methods applicable to past, present, and/or future chip cards, such a chip and pin, challenge response, etc.

Figure 3:
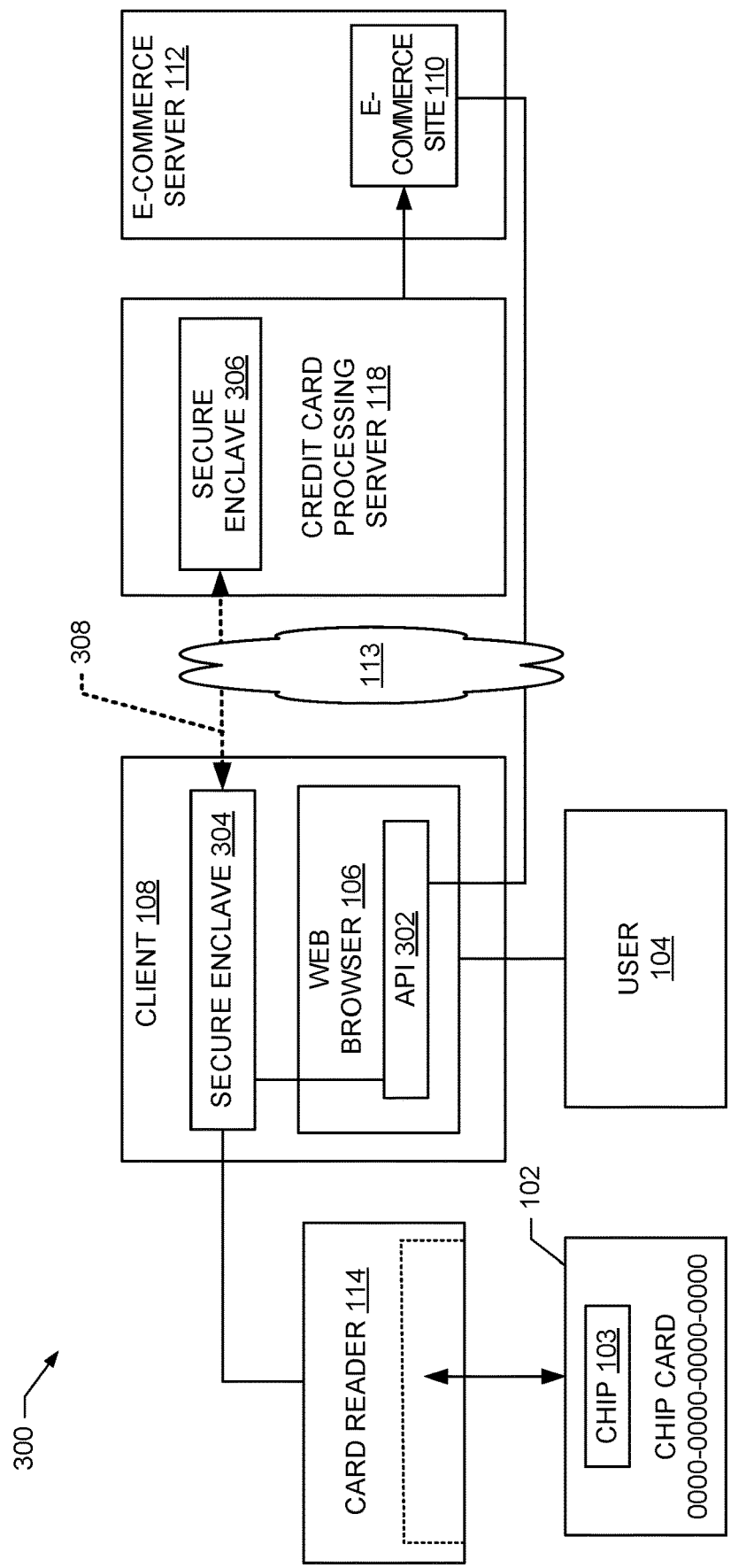
FIG. 3 illustrates yet another example environment in which a chip card is securely handled, in accordance with this disclosure.

FIG. 3 illustrates another example environment 300 in which the example chip card 102 having the chip 103 is securely handled, in accordance with this disclosure. To allow the e-commerce site 110 to communicate with the chip 103, the example web browser 106 implements an example API 302. The example API 302 of FIG. 3 presents an interface to the e-commerce site 110 that allows the e-commerce site 110 to query the user's web browser 106 for an attached card reader 114 that supports communication with the chip 103 on the chip card 102. The example API 302 additionally enables the e-commerce site 110 to trigger the execution of an example secure enclave 304 at the client device 108 that interacts with an example secure enclave 306 at the example credit card processing server 118 over an example secure communication link 308. The secure enclave 304 at the client device 108 executes an interface that enables the secure enclave 306 at the credit card processing server 118 to securely interact with the chip 103 over the secure communication link 308.

When the e-commerce site 110 needs, for example, payment for a transaction, the example e-commerce site 110 of FIG. 3 queries the example API 302 to determine whether the user's web browser 106 and hardware are capable of performing chip-based transactions. If so, and if the card 102 is not already inserted, brought near, etc., the user is prompted to insert the card 102 into the card reader 114, bring it near the card reader 114, etc. Once inserted or brought near, the API 302 initiates the secure enclave 304 at the client device 108. The secure enclave 306 at the credit card processing server 118 interacts with the secure enclave 304 at the client device 108 to obtain the credit card data from the chip 103. If the credit card processing server 118 authorizes the charge to the card 102 for the transaction, it notifies the e-commerce site 110 that payment has been made. If payment is successful, the e-commerce site 110 completes the transaction. In some examples, the secure enclaves 304 and 306 are not implemented, and the credit card processing server 118 communicates with the chip 103 via, for example, the API 302, an independent network connection of the card reader 114, etc.

In some examples, the secure enclave 304 verifies the chip 103 and/or the credit card data before it is sent to the secure enclave 306. In some examples, the secure enclave 306 performs the verification of the chip 103 and/or the credit card data. Verification may be performed, for example, using any number and/or type(s) of methods applicable to past, present, and/or future chip cards, such a chip and pin, challenge response, etc.

In the illustrated examples of FIGS. 1-3, chip card data is passed through respective ones of the API 116, the secure enclave 204, and the secure enclave 304. However, chip card data may be passed in other ways and/or via other paths. For example, the card reader 114 could have a network connection, independent of a network connection of the client 108, that is orchestrated and coordinated by the client API 116, 202, 302. In such examples, the card reader 114 communicates over the card reader's independent network connection with the e-commerce site 112 and/or the credit card processing site 118 directly rather than chip card data being tunneled through the client's own network connection.

Figure 4:
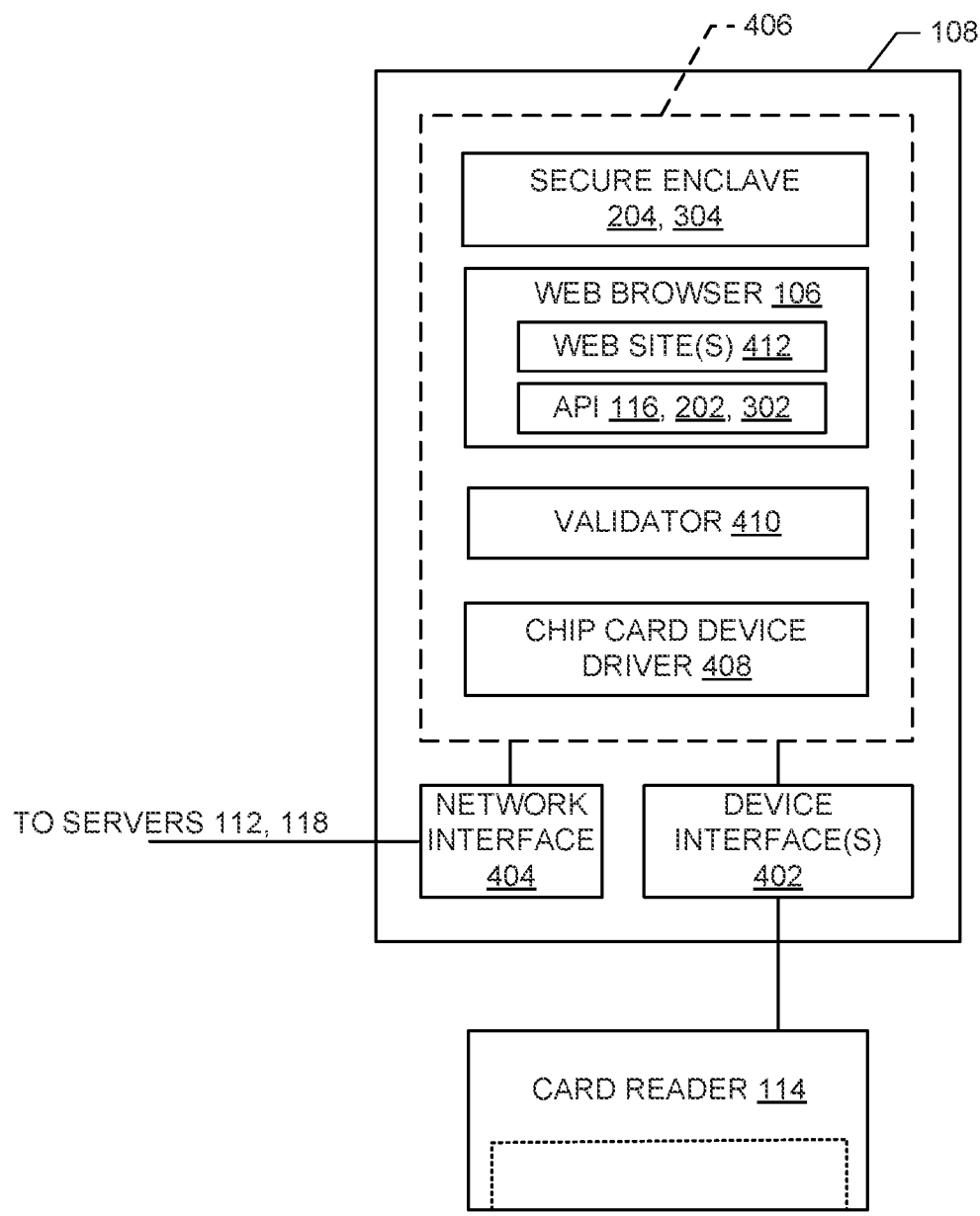
FIG. 4 is a block diagram of an example implementation of the example clients of FIGS. 1-3.

FIG. 4 is a block diagram of an example implementation of the example client devices 108 of FIGS. 1-3. To communicatively couple the example client device 108 of FIG. 4 with the example card reader 114, the example client device 108 of FIG. 4 includes any number and/or type(s) of example device interface(s) 402. Example device interfaces 402 include, but are not limited to, a USB interface, an NFC interface, a BLUETOOTH interface, etc.

To communicatively couple the example client device 108 of FIG. 4 with the e-commerce site 110, and/or the credit card processing server 118, etc., the example client device 108 of FIG. 4 includes any number and/or type(s) of example network interface(s) 404. The example network interface(s) 404 of FIG. 4 may be, for example, any type of wireless network interface, wired network interface, cellular network interface, satellite network interface, etc. In some examples, the card reader 114 is coupled to the client device 108 via the network interface(s) 404.

To interface software components 406 of the example client device 108 of FIG. 4 with the card reader 114, the example client device 108 of FIG. 4 includes an example chip card device driver 408. The example chip card device driver 408 of FIG. 4 is implemented according to an operating system (not shown) and/or a hardware architecture of the client device 108 of FIG. 4.

To validate the chip 103 of the chip card 102, and/or data stored thereon, the example client device 108 of FIG. 4 includes an example validator 410. The example validator 410 of FIG. 4 implements any number and/or type(s) of validation functions for the chip 103, and/or data stored thereon according to the specifications, and/or standards for the chip 103, and/or the data stored thereon.

To enable a user to interact with web sites 412, such as the example e-commerce site 110, the example client device 108 of FIG. 4 executes the example web browser 106. The web sites 412 are provided to the web browser 106 by, for example, the e-commerce server 112, and are presented at the client device 108 in the web browser 106.

To enable, for example, the e-commerce site 110 and/or the credit card processing server 118 to interact with the chip 103 of the chip card 102, the example web browser 106 executes one or more of the example APIs 116, 202 and 302 discussed above in connection with FIGS. 1-3.

In some examples, to enable even more secure handling of credit card data stored on chip cards, the example client device 108 of FIG. 4 executes one or more of the example secure enclaves 204 and 304 in which, for example, all or a portion of the APIs 116, 202, and 302, and the validator 410 may be executed. In some examples, the client device 108 does not execute and/or include the secure enclave 204, 304. In some examples, whether to execute the secure enclave 204, 304 is determined at runtime. In some examples, the e-commerce server 112 and/or the credit card processing server 118 determines whether the secure enclave 204, 304 is preferred (e.g., processing of chip card data can proceed without a secure enclave 204, 304 if not available), or is required to proceed.

While an example manner of implementing the client devices 108 of FIGS. 1-3 is illustrated in FIG. 4, one or more of the elements, processes and/or devices illustrated in FIG. 4 may be combined, divided, re-arranged, omitted, eliminated and/or implemented in any other way. Further, the example device interface(s) 402, the example network interface 404, the example chip card device driver 408, the example validator 410, the example web browser 106, the example API(s) 112, 202 and 302, the example secure enclave 204, 304 and/or, more generally, the example client device 108 of FIG. 4 may be implemented by hardware, software, firmware and/or any combination of hardware, software and/or firmware. Thus, for example, any of the example device interface(s) 402, the example network interface 404, the example chip card device driver 408, the example validator 410, the example web browser 106, the example API(s) 112, 202 and 302, the example secure enclave 204, 304 and/or, more generally, the example client device 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA (s)), and/or field programmable logic device(s) (FPLD(s)). When reading any of the apparatus or system claims of this patent to cover a purely software and/or firmware implementation, at least one of the example device interface(s) 402, the example network interface 404, the example chip card device driver 408, the example validator 410, the example web browser 106, the example API(s) 112, 202 and 302, the example secure enclave 204, 304 and/or the example client device 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example client device 108 of FIG. 4 may include one or more elements, processes and/or devices in addition to, or instead of, those illustrated in FIG. 4, and/or may include more than one of any or all the illustrated elements, processes and devices.

Figure 5:
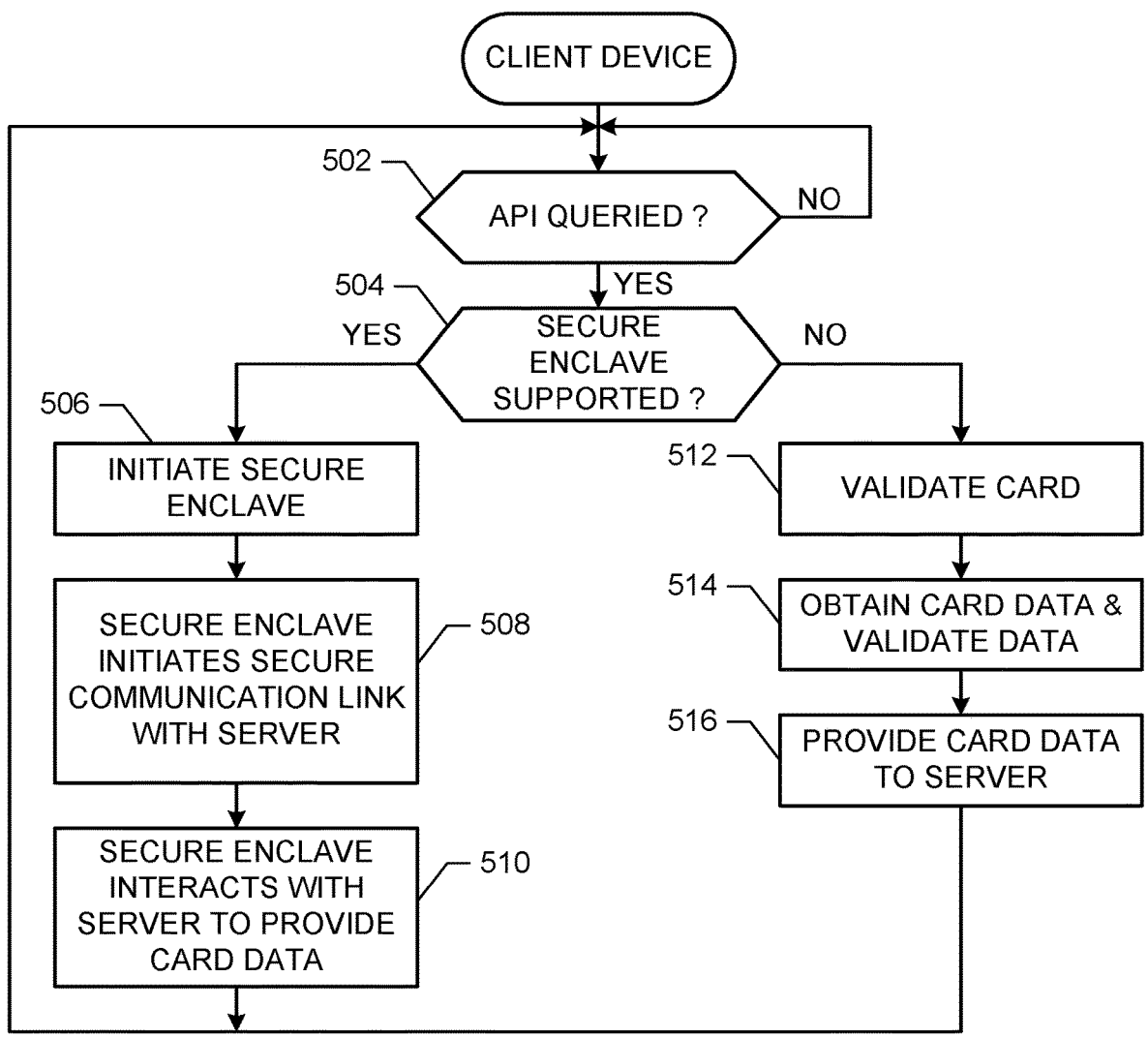
FIG. 5 is a flowchart representing example processes that may be implemented as machine-readable instructions that may be executed to implement the example clients of FIGS. 1-3.

A flowchart representative of example machine-readable instructions for implementing the example client devices 108 of FIGS. 1-4 is shown in FIG. 5. In this example, the machine-readable instructions comprise a program for execution by a processor such as the processor 1010 shown in the example processor platform 1000 discussed below in connection with FIG. 10. The program may be embodied in software stored on a non-transitory computer readable storage medium such as a CD, a floppy disk, a hard drive, a DVD, a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowchart illustrated in FIG. 5, many other methods of implementing the example client devices 108 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The example program of FIG. 5 begins at block 502. At block 502, the example client device 108 determines whether a query for a card reader 114 coupled to or part of the client device 108 was received (block 502). For example, the web browser 106 monitors incoming web site data for commands associated with chip cards. In some examples, the web-based API commands associated with chip cards are standardized and agreed upon by the chip card industry. If a query is received (block 502), the API 116, 202, 302 determines whether secure enclaves 204, 206, 304, 306 are supported by the client device 108 and the server 112, 118 (block 504). For example, the query for the card reader 114 may include an indication that the server 112, 118 supports a secure enclave. If secure enclaves 204, 206, 304, 306 are supported (block 504), the API 202, 302 initiates the secure enclave 204, 304 at the client device 108 (block 506). For example, the API 202, 302 uses INTEL SGX to initiate the secure enclave 204, 304. The secure enclave 204, 304 initiates a secure communication link with the secure enclave 206, 306 at the server 112, 118 (block 508). For example, the secure enclave 204, 304 initiates the secure communication link using INTEL SGX. The secure enclave 206, 306 at the server 112, 118 interacts over the secure communication link with the secure enclave 204, 304 at the client device 108 to obtain credit card data from the chip 103 of the chip card 102 (block 510). Control returns to block 502 to wait for another query for a chip card reader.

Returning to block 504, if the API 116, 202, 302 determines that secure enclaves 204, 206, 304, 306 are not supported by both the client device 108 and the server 112, 118 (block 504), the example validator 410 validates the chip 103 using, for example, a challenge-response transaction (block 512). In some examples, validation of the chip 103 is skipped, optional, omitted, etc. For example, the validator 410 implements any number and/or type(s) of validation functions for the chip 103, and/or data stored thereon according to the specifications, and/or standards for the chip 103, and/or the data stored thereon. In response to one or more commands received from the e-commerce server 112, the example API 116, 202, 302 obtains credit card data from the chip 103 of the chip card 102 and, in some examples, validates the obtained chip card data (block 514). For example, the API 116, 202, 302 implements any number and/or type(s) of data access functions for the chip 103 according to the specifications, and/or standards for the chip 103. The example API 116, 202, 302 provides the credit card data obtained from the chip 103 to the server 112, 118 (block 516). Control returns to block 502 to wait for another query for a chip card reader.

Figure 6:
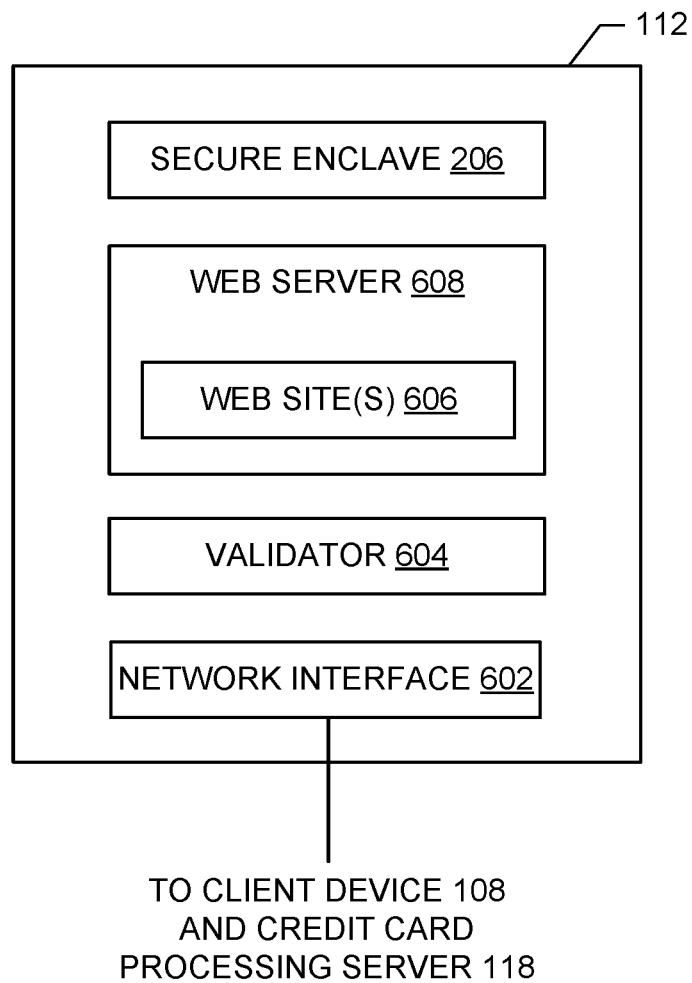
FIG. 6 is a block diagram of an example implementation of the example e-commerce servers of FIGS. 1-3.

FIG. 6 is a block diagram of an example implementation of the example e-commerce server 112 of FIGS. 1-3. To communicatively couple the example e-commerce server 112 of FIG. 6 with the example client device 108, and/or the example credit card processing server 118, etc., the example e-commerce server 112 of FIG. 6 includes any number and/or type(s) of example network interface(s) 602. The example network interface(s) 602 of FIG. 6 may be, for example, any type of wireless network interface, wired network interface, cellular network interface, satellite network interface, etc.

To validate the chip 103 of the chip card 102, and/or data stored thereon, the example e-commerce server 112 of FIG. 6 includes an example validator 604. The example validator 604 of FIG. 6 implements any number and/or type(s) of validation functions for the chip 103, and/or data stored thereon according to the specifications, and/or standards for the chip 103, and/or the data stored thereon.

To provide (e.g., serve) web sites 606, such as the example e-commerce site 110, the example e-commerce server 112 of FIG. 6 includes an example web server 608. The web site(s) 606 are provided by the web server 608 to, for example, the client device 108 where they are presented in the web browser 106.

In some examples, to enable even more secure handling of credit card data stored on chip cards, the example e-commerce server 112 of FIG. 6 includes the example secure enclave 206 in which, for example, all or a portion of the web site(s) 606 may be served, and/or the validator 604 may be executed. In some examples, the e-commerce server 112 does not execute and/or include the secure enclave 206. In some examples, whether to execute the secure enclave 206 is determined at runtime. In some examples, the e-commerce server 112 can require the client 108 execute the secure enclave 204.

While an example manner of implementing the e-commerce server 112 of FIGS. 1-3 is illustrated in FIG. 6, one or more of the elements, processes and/or devices illustrated in FIG. 6 may be combined, divided, re-arranged, omitted, eliminated and/or implemented in any other way. Further, the example network interface 602, the example validator 604, the example web server 608, the example secure enclave 206 and/or, more generally, the example e-commerce server 112 of FIG. 6 may be implemented by hardware, software, firmware and/or any combination of hardware, software and/or firmware. Thus, for example, any of the example network interface 602, the example validator 604, the example web server 608, the example secure enclave 206 and/or, more generally, the example e-commerce server 112 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example network interface 602, the example validator 604, the example web server 608, the example secure enclave 206, and/or the example e-commerce server 112 is/are hereby expressly defined to include a non-transitory computer readable storage device or storage disk such as a memory, a DVD, a CD, a Blu-ray disk, etc. including the software and/or firmware. Further still, the example e-commerce server 112 of FIG. 6 may include one or more elements, processes and/or devices in addition to, or instead of, those illustrated in FIG. 6, and/or may include more than one of any or all the illustrated elements, processes and devices.

Figure 7:
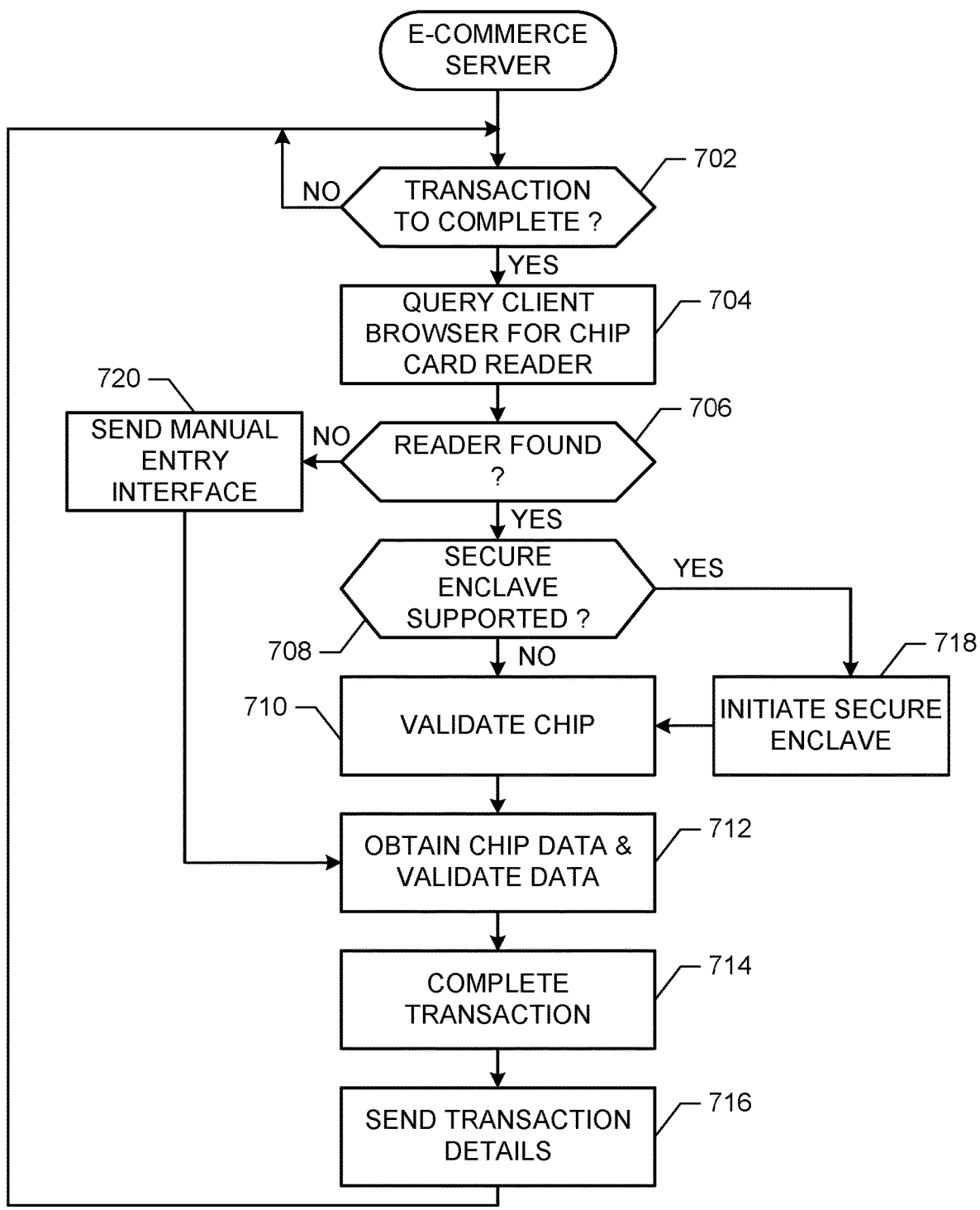
FIG. 7 is a flowchart representing example processes that may be implemented as machine-readable instructions that may be executed to implement the example e-commerce servers of FIGS. 1-3.

A flowchart representative of example machine-readable instructions for implementing the example e-commerce server 112 of FIGS. 1-3 and 6 is shown in FIG. 7. In this example, the machine-readable instructions comprise a program for execution by a processor such as the processor 1010 shown in the example processor platform 1000 discussed below in connection with FIG. 10. The program may be embodied in software stored on a non-transitory computer readable storage medium such as a CD, a floppy disk, a hard drive, a DVD, a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowchart illustrated in FIG. 7, many other methods of implementing the example e-commerce server 112 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The example program of FIG. 7 begins at block 702. At block 702, the e-commerce site 110 detects that a credit card transaction needs to be completed. For example, the e-commerce site 110 detects when the user 104 of the e-commerce site 110 indicates they want to pay for an item. The e-commerce site 110 queries the API 116, 202, 302 of the web browser 106 at the client device 108 associated with the user 104 for a communicatively coupled chip card reader 114 (block 704). For example, the e-commerce site 110 accesses a function of the API 116, 202, 302 of the web browser 106. If the chip card reader 114 is found (block 706), the e-commerce site 110 queries the API 116, 202, 302 to determine whether the client device 108 supports the secure enclave 204, 304 (block 708). If the client device 108 does not support the secure enclave 204, 304 (block 708), the validator 410, via the API 116, 202, 302, validates the chip 103 of the chip card 102 using, for example, a challenge-response transaction (block 710). In some examples, validation of the chip 103 may be omitted, skipped, optional, etc. For example, the validator 604 of FIG. 6 implements any number and/or type(s) of validation functions for the chip 103, and/or data stored thereon according to the specifications, and/or standards for the chip 103, and/or the data stored thereon. The e-commerce site 110, via the API 116, 202, 302, obtains credit card data (e.g., card data) from the chip 103 of the chip card 102 and, in some examples, validates the obtained chip card data (block 712). The e-commerce site 110 completes the transaction using the obtained credit card data (block 714), and sends transaction details to the credit card processing server 118 for payment (block 716). Control returns to block 702 to wait for another transaction to complete.

Returning to block 708, if the client device 108 supports the secure enclave 204, 304 (block 708), the e-commerce site 110 initiates the secure enclave 206 at the e-commerce server 112 or at the secure enclave 306 at the credit card processing server 118 (block 718). When the secure enclave 206 is initiated, the validator 604, via the API 116, 202, 302, validates the chip 103 of the chip card 102 (block 710) or, if the chip 103 is not to be validated control proceeds to block 712. The secure enclave 206 obtains credit card data from the chip 103 of the chip card 102 (block 712), and the e-commerce site 112 completes the transaction using the credit card data obtained by the secure enclave 206 (block 714), and sends transaction details to the credit card processing server 118 for payment (block 716). Control returns to block 702 to wait for another transaction to complete.

Alternatively, when the secure enclave 306 is initiated, the credit card processing server 118 completes the transaction using credit card data obtained from the chip 103 by the secure enclave 306 (block 714), and sends payment successful details to the e-commerce site 110 (block 716). Control returns to block 702 to wait for another transaction to complete.

Returning to block 706, if a communicatively coupled chip card reader 114 is not found (block 706), the e-commerce site 110 provides a manual web-based interface to the web browser 106 that the user 104 can use to provide (e.g., manually enter) credit card data for the e-commerce site 110 (block 720). The e-commerce site 110, via the manual web-based interface, obtains credit card data from the user 104 (block 712). The e-commerce site 110 completes the transaction using the credit card data obtained manually from the user 104 (block 714), and sends transaction details to the credit card processing server 118 for payment (block 716). Control returns to block 702 to wait for another transaction to complete.

Figure 8:
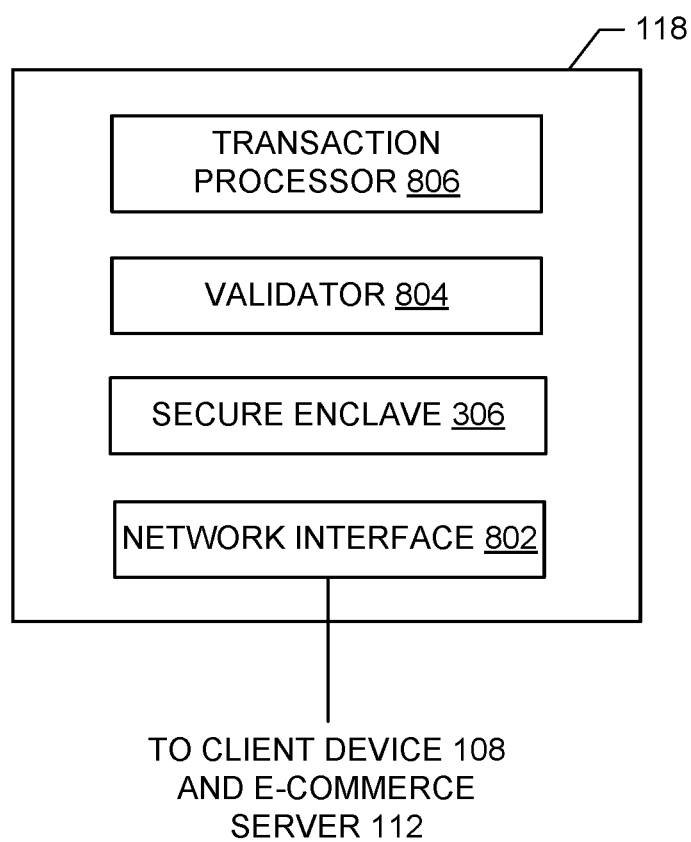
FIG. 8 is a block diagram of an example implementation of the example credit card processing servers of FIGS. 1-3.

FIG. 8 is a block diagram of an example implementation of the example credit card processing server 118 of FIGS. 1-3. To communicatively couple the example credit card processing server 118 of FIG. 8 with the example client device 108, and/or the example e-commerce server 112, etc., the example credit card processing server 118 of FIG. 8 includes any number and/or type(s) of example network interface(s) 802. The example network interface(s) 802 of FIG. 8 may be, for example, any type of wireless network interface, wired network interface, cellular network interface, satellite network interface, etc.

To validate the chip 103 of the chip card 102, and/or data stored thereon, the example credit card processing server 118 of FIG. 8 includes an example validator 804. The example validator 804 of FIG. 8 implements any number and/or type(s) of validation functions for the chip 103, and/or data stored thereon according to the specifications, and/or standards for the chip 103, and/or the data stored thereon.

In some examples, to enable even more secure handling of credit card data stored on chip cards, the example credit card processing server 118 of FIG. 8 includes the example secure enclave 306 in which, for example, all or a portion of an example transaction processor 806, and/or the validator 604 may be executed. In some examples, the credit card processing server 118 does not execute and/or include the secure enclave 306. In some examples, whether to execute the secure enclave 306 is determined at runtime. In some examples, the credit card processing server 118 can require the client 108 execute the secure enclave 304.

To process credit card transactions, the example credit card processing server 118 of FIG. 8 includes an example transaction processor 806.

While an example manner of implementing the credit card processing server 118 of FIGS. 1-3 is illustrated in FIG. 8, one or more of the elements, processes and/or devices illustrated in FIG. 8 may be combined, divided, re-arranged, omitted, eliminated and/or implemented in any other way. Further, the example network interface 802, the example validator 804, the example secure enclave 306 and/or, more generally, the example credit card processing server 118 of FIG. 8 may be implemented by hardware, software, firmware and/or any combination of hardware, software and/or firmware. Thus, for example, any of the example network interface 802, the example validator 804, the example secure enclave 306 and/or, more generally, the example credit card processing server 118 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example network interface 802, the example validator 804, the example secure enclave 306 and/or, more generally, the example credit card processing server 118 is/are hereby expressly defined to include a non-transitory computer readable storage device or storage disk such as a memory, a DVD, a CD, a Blu-ray disk, etc. including the software and/or firmware. Further still, the example e-commerce server 112 of FIG. 8 may include one or more elements, processes and/or devices in addition to, or instead of, those illustrated in FIG. 8, and/or may include more than one of any or all the illustrated elements, processes and devices.

Figure 9:
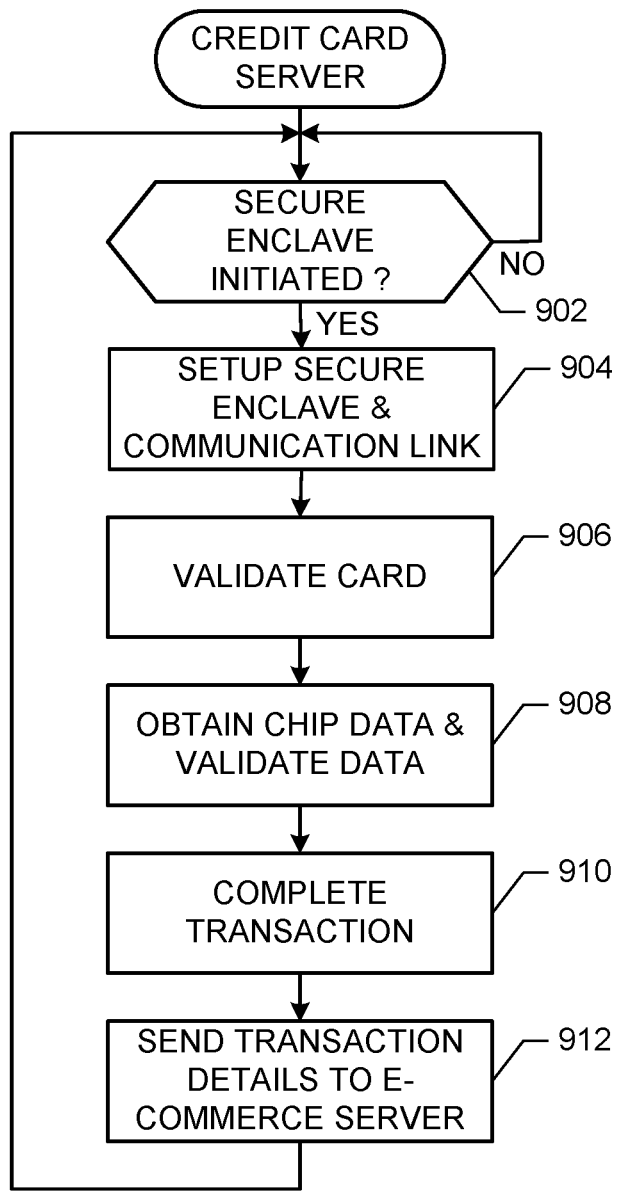
FIG. 9 is a flowchart representing example processes that may be implemented as machine-readable instructions that may be executed to implement the example credit card processing servers of FIGS. 1-3.

A flowchart representative of example machine-readable instructions for implementing the example credit card processing server 118 of FIGS. 1-3 and 8 is shown in FIG. 9. In this example, the machine-readable instructions comprise a program for execution by a processor such as the processor 1010 shown in the example processor platform 1000 discussed below in connection with FIG. 10. The program may be embodied in software stored on a non-transitory computer readable storage medium such as a CD, a floppy disk, a hard drive, a DVD, a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowchart illustrated in FIG. 9, many other methods of implementing the example credit card processing server 118 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The example program of FIG. 9 begins at block 902. At block 902, the credit card processing server 118 determines whether a request to handle a transaction directly with the chip card 102 is received (block 902). For example, the credit card processing server 118 determines whether the e-commerce site 110 indicates to the credit card processing server 118 is to directly handle payment for a transaction. If a request to directly handle a transaction is received (block 902), the credit card processing server 118 initiates the example secure enclave 306 and secure communication link (block 904) using, for example INTEL SGX. The validator 804, via the API 116, 202, 302, validates the chip 103 of the chip card 102 using, for example, a challenge-response transaction (block 906). In some examples, validation of the chip 103 is skipped, omitted, optional, etc. The secure enclave 306 obtains credit card data from the chip 103 of the chip card 102 and, in some examples, validates the obtained chip card data (block 908), and the transaction processor 806 completes the transaction using the credit card data obtained by the secure enclave 306 (block 910), and sends a payment made notification to the e-commerce site 110 (block 912). Control returns to block 902 to wait for another request to handle a transaction.

As mentioned above, the example processes of FIGS. 5, 7 and 9 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 10:
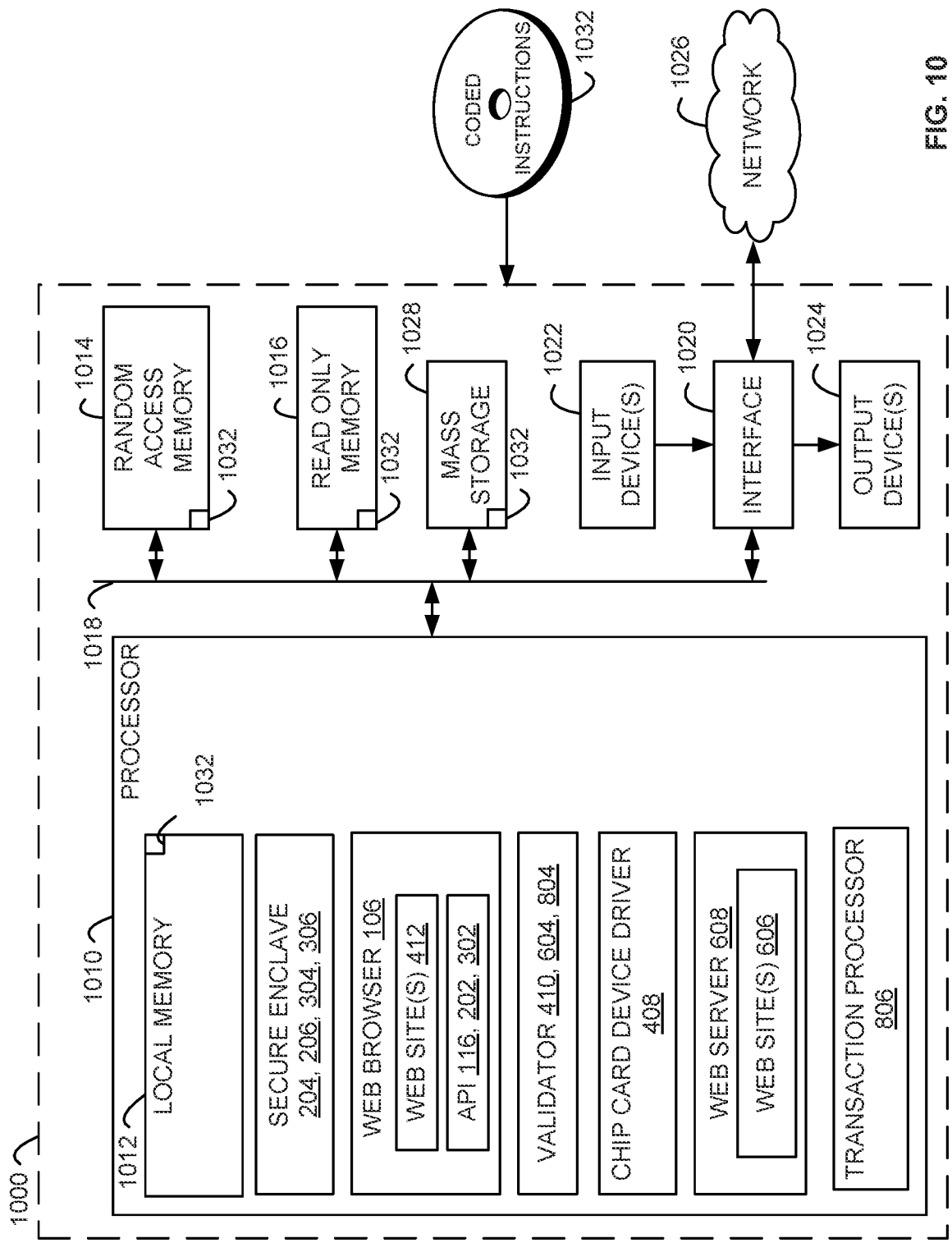
FIG. 10 illustrates an example processor platform structured to execute the example machine-readable instructions of FIGS. 5, 7 and 9 to implement the example clients, the example e-commerce servers, and the example credit card processing servers of FIGS. 1-3, 4, 6 and 8.

FIG. 10 is a block diagram of an example processor platform 1000 capable of executing the instructions of FIGS. 5, 7 and 9 to implement the client device 108 of FIGS. 1-4, the e-commerce server 112 of FIGS. 1-3 and 6, and the credit card processing server 118 of FIGS. 1-3 and 8. The processor platform 1000 can be, for example, a server, a personal computer, a workstation, a mobile device (e.g., a cell phone, a smartphone, a tablet such as an IOS' or ANDROID™ device), a personal digital assistant (PDA), an Internet appliance, a gaming console, a set top box, or any other type of computing device.

The processor platform 1000 of the illustrated example includes a processor 1010. The processor 1010 of the illustrated example is hardware. For example, the processor 1010 can be implemented by one or more integrated circuits, logic circuits, microprocessors, GPUs, DSPs or controllers from any desired family or manufacturer. The hardware processor may be a semiconductor based (e.g., silicon based) device. In this example, the processor implements the secure enclaves 204, 206, 304 and 306, the web browser 106, the APIs 116, 202 and 302, the validators 410, 604 and 804, the chip card device driver 408, the web server 608 and the transaction processor 806.

The processor 1010 of the illustrated example includes a local memory 1012 (e.g., a cache). The processor 1010 of the illustrated example is in communication with a main memory including a volatile memory 1014 and a non-volatile memory 1016 via a bus 1018. The volatile memory 1014 may be implemented by Synchronous Dynamic Random-access Memory (SDRAM), Dynamic Random-access Memory (DRAM), RAMBUS® Dynamic Random-access Memory (RDRAM®) and/or any other type of random-access memory device. The non-volatile memory 1016 may be implemented by flash memory and/or any other desired type of memory device. Access to the main memory 1014, 1016 is controlled by a memory controller (not shown).

The processor platform 1000 of the illustrated example also includes an interface circuit 1020. The interface circuit 1020 may be implemented by any type of interface standard, such as an Ethernet interface, a universal serial bus (USB) interface, a Bluetooth® interface, a near field communication (NFC) interface, and/or a peripheral component interface (PCI) express interface. In this example, the interface circuit 1020 implements the device interface(s) 402.

In the illustrated example, one or more input devices 1022 are connected to the interface circuit 1020. The input device (s) 1022 permit(s) a user to enter data and/or commands into the processor 1010. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.) a tactile output device, a printer, and/or speakers. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, and/or network interface to facilitate exchange of data with external machines (e.g., computing devices of any kind) via a network 1026 (e.g., an Ethernet connection, a digital subscriber line (DSL), a telephone line, a coaxial cable, a cellular telephone system, a Wi-Fi system, etc.). In some examples of a Wi-Fi system, the interface circuit 1020 includes a radio frequency (RF) module, antenna(s), amplifiers, filters, modulators, etc. In this example, the interface circuit 1020 implements the example network interfaces 404, 602 and 802.

The processor platform 1000 of the illustrated example also includes one or more mass storage devices 1028 for storing software and/or data. Examples of such mass storage devices 1028 include floppy disk drives, hard drive disks, CD drives, Blu-ray disk drives, redundant array of independent disks (RAID) systems, and DVD drives.

Coded instructions 1032 including the coded instructions of FIGS. 5, 7 and 9 may be stored in the mass storage device 1028, in the volatile memory 1014, in the non-volatile memory 1016, and/or on a removable tangible computer readable storage medium such as a CD or DVD.

From the foregoing, it will be appreciated that example methods, apparatus and articles of manufacture have been disclosed that improve the security of credit card transaction for purchases by persons not using a POS device. From the foregoing, it will be appreciated that methods, apparatus and articles of manufacture have been disclosed that enhance the operations of a computer by enabling the computer (e.g., personal computers, mobile devices, gaming consoles, etc.)

to provide e-commerce web sites remote access to chip card readers coupled to the computer via their web browser. In some examples, computer operations can be made more secure through the use of secure enclaves. Furthermore, example methods, apparatus, and/or articles of manufacture disclosed herein identify and overcome limitations in the prior art to perform card present transactions when persons are not using a POS device.

Example methods, apparatus, and articles of manufacture to securely handle chip card data are disclosed herein. Further examples and combinations thereof include at least the following.

Example 1 is a method including: providing, by executing an instruction with a first processor of a client device, an application programming interface (API) in a web client of the client device; in response to detecting, in the web client at the client device, a query from a server for card data, operating, by executing an instruction with the first processor of the client device, the API in the web client at the client device to obtain the card data stored on a chip of a chip card communicatively coupled to the client device; and sending, by executing an instruction with the first processor of the client device, the card data to the server.

Example 2 is the method of example 1, further including determining, by executing an instruction with the first processor of the client device, whether the chip card is communicatively coupled to the client device.

Example 3 is the method of example 2, further including, when the chip card is not communicatively coupled to the client device, prompting in the web client, by executing an instruction with the first processor of the client device, a user to manually provide the card data, the prompt provided by the server.

Example 4 is the method of example 2, further including, when the chip card is not communicatively coupled to the client device, prompting in the web client, by executing an instruction with the first processor of the client device, a user to communicatively couple the chip card to the client device, the prompt provided by the API in the web client of the client device.

Example 5 is the method of example 1, further including providing, by executing an instruction with the first processor of the client device, a device interface for a card reader communicatively coupled to the client device, and obtaining, by executing an instruction with the first processor of the client device, the card data from the chip card by interacting with the card reader via the device interface.

Example 6 is the method of example 1, wherein the operating, by executing an instruction with the first processor of the client device, the API in the web client at the client device to obtain the card data from a chip of the chip card includes providing, by executing an instruction by a second processor of the client device, a first secure enclave, the first secure enclave to communicate the card data from the client device to a second secure enclave at the server.

Example 7 is the method of example 6, wherein the card data bypasses at least one of the first processor, or the web client when the first secure enclave communicates the card data from the client device to the second secure enclave at the server.

Example 8 is the method of example 6, wherein the first secure enclave and the second secure enclave transmit the card data from the client device to the server over a secure communication link.

Example 9 is the method of example 8, wherein the API tunnels the secure communication link through a less secure communication link.

Example 10 is the method of example 6, wherein the first processor of the client device includes the second processor of the client device.

Example 11 is the method of example 1, wherein the server includes an e-commerce site.

Example 12 is the method of example 1, wherein the server includes a chip card processing server.

Example 13 is a client device, including:
a processor; and a non-transitory computer-readable storage medium storing instructions that, when executed, cause the client device to: provide an application programming interface (API) in a web client of the client device; in response to detecting, in the web client at the client device, a query from a server for card data, operating the API in the web client at the client device to obtain the card data from a chip of a chip card communicatively coupled to the client device, the card data stored on the chip; and send the card data to the server.

Example 14 is the client device of example 13, further including a network interface to receive the query and send the card data, and a device interface to communicatively couple a chip card reader to the client device, the chip of the chip card communicatively coupled to the client device via the chip card reader.

Example 15 is the client device of example 13, wherein the API, when the chip card is not communicatively coupled to the client device, provides a prompt in the web client for at least one of manually providing the card data, or coupling the chip card to the chip card reader.

Example 16 is the client device of example 13, wherein the instructions, when executed, cause the client device to provide a first secure enclave, the first secure enclave to communicate the card data from the client device to a second secure enclave at the server.

Example 17 is the client device of example 13, further including a second processor, and a second non-transitory computer-readable storage medium storing instructions that, when executed, cause the second processor to execute a first secure enclave, the first secure enclave to communicate the card data from the client device to a second secure enclave at the server.

Example 18 is a non-transitory computer-readable storage medium storing instructions that, when executed, cause a machine to perform at least: providing, by executing an instruction with a first processor of a client device, an application programming interface (API) in a web client of the client device; in response to detecting, in the web client at the client device, a query from a server for card data, operating, by executing an instruction with the first processor of the client device, the API in the web client at the client device to obtain the card data stored on a chip of a chip card communicatively coupled to the client device; and sending, by executing an instruction with the first processor of the client device, the card data to the server.

Example 19 is the non-transitory computer-readable storage medium of example 18, wherein the instructions, when executed, cause the machine to, when the chip card is not communicatively coupled to the client device, provide a prompt in the web client for at least one of manually providing the card data, or coupling the chip card to the chip card reader.

Example 20 is the non-transitory computer-readable storage medium of example 18, wherein the instructions, when executed, cause the machine to, operate the API in the web client at the client device to obtain the card data from the chip of the chip card includes providing a first secure enclave, the first secure enclave to communicate the card data from the client device to a second secure enclave at the server.

Example 21 is a method, including: providing, by executing an instruction with a first processor of a client device, an application programming interface (API) in a web client of the client device; in response to detecting, in the web client at the client device, a query from a server for card data, operating, by executing an instruction with the first processor of the client device, the API in the web client at the client device to obtain the card data stored on a chip of a chip card communicatively coupled to the client device; and sending, by executing an instruction with the first processor of the client device, the card data to the server.

Example 22 is the method of example [0094], further including determining, by executing an instruction with the first processor of the client device, whether the chip card is communicatively coupled to the client device.

Example 23 is the method of example [0095], further including, when the chip card is not communicatively coupled to the client device, prompting in the web client, by executing an instruction with the first processor of the client device, a user to at least one of manually provide the card data or communicatively couple the chip card to the client device, the prompt provided by the server, the prompt provided by the API in the web client of the client device.

Example 24 is the method of any of examples [0094] to 23, further including providing, by executing an instruction with the first processor of the client device, a device interface for a card reader communicatively coupled to the client device, and obtaining, by executing an instruction with the first processor of the client device, the card data from the chip card by interacting with the card reader via the device interface.

Example 25 is the method of any of examples [0094] to 24, wherein the operating, by executing an instruction with the first processor of the client device, the API in the web client at the client device to obtain the card data from a chip of the chip card includes providing, by executing an instruction by a second processor of the client device, a first secure enclave, the first secure enclave to communicate the card data from the client device to a second secure enclave at the server.

Example 26 is the method of example 25, wherein the card data bypasses at least one of the first processor, or the web client when the first secure enclave communicates the card data from the client device to the second secure enclave at the server.

Example 27 is the method of any of example [0098] or example 26, wherein the first secure enclave and the second secure enclave transmit the card data from the client device to the server over a secure communication link.

Example 28 is the method of example 27, wherein the API tunnels the secure communication link through a less secure communication link.

Example 29 is the method of any of examples [0098] to 28, wherein the first processor of the client device includes the second processor of the client device.

Example 30 is the method of any of examples [0094] to 29, wherein the server includes at least one of an e-commerce site, or a chip card processing server.

Example 31 is a client device, including: a processor; and a non-transitory computer-readable storage medium storing instructions that, when executed, cause the client device to: provide an application programming interface (API) in a web client of the client device; in response to detecting, in the web client at the client device, a query from a server for card data, operating the API in the web client at the client device to obtain the card data from a chip of a chip card communicatively coupled to the client device, the card data stored on the chip; and send the card data to the server.

Example 32 is the client device of example 31, further including a network interface to receive the query and send the card data, and a device interface to communicatively couple a chip card reader to the client device, the chip of the chip card communicatively coupled to the client device via the chip card reader.

Example 33 is the client device of example 31 or 32, wherein the API, when the chip card is not communicatively coupled to the client device, provides a prompt in the web client for at least one of manually providing the card data, or coupling the chip card to the chip card reader.

Example 34 is the client device of any of examples 31 to 33, wherein the instructions, when executed, cause the client device to provide a first secure enclave, the first secure enclave to communicate the card data from the client device to a second secure enclave at the server.

Example 35 is the client device of any of examples 31 to 34, further including a second processor, and a second non-transitory computer-readable storage medium storing instructions that, when executed, cause the second processor to execute a first secure enclave, the first secure enclave to communicate the card data from the client device to a second secure enclave at the server.

Example 36 is a non-transitory computer-readable storage medium comprising instructions that, when executed, cause a computer processor to perform the method of any of examples 21 to 30.

Example 37 is a system, including: means for providing an application programming interface (API) in a web client of the client device; means for detecting, in the web client at the client device, a query from a server for card data, operating the API in the web client at the client device to obtain the card data stored on a chip of a chip card communicatively coupled to the client device; and means for sending the card data to the server.

Example 38 is the system of example 37, further including means for determining whether the chip card is communicatively coupled to the client device.

Example 39 is the system of example 38, further including means for, when the chip card is not communicatively coupled to the client device, prompting in the web client a user to at least one of manually provide the card data or communicatively couple the chip card to the client device, the prompt provided by the server, the prompt provided by the API in the web client of the client device.

Example 40 is the system of any of examples 37 to 39, further including: means for providing a device interface for a card reader communicatively coupled to the client device; and means for obtaining the card data from the chip card by interacting with the card reader via the device interface.

Example 41 is the system of any of examples 37 to 40, wherein the means for operating the API in the web client at the client device to obtain the card data from a chip of the chip card includes providing a first secure enclave, the first secure enclave to communicate the card data from the client device to a second secure enclave at the server.

Example 42 is the system of example 41, wherein the card data bypasses at least one of the first processor, or the web client when the first secure enclave communicates the card data from the client device to the second secure enclave at the server.

Example 43 is the system of any of example 41 or 42, wherein the first secure enclave and the second secure enclave transmit the card data from the client device to the server over a secure communication link.

Example 44 is the system of example 43, wherein the API tunnels the secure communication link through a less secure communication link.

Example 45 is the system of any of examples 37 to 44, wherein the server includes at least one of an e-commerce site, or a chip card processing server.

"Including" and "comprising" (and all forms and tenses thereof) are used herein to be open ended terms. Thus, whenever a claim lists anything following any form of "include" or "comprise" (e.g., comprises, includes, comprising, including, having, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to securely handle a chip card, comprising:
    creating, with an application programming interface (API) executed by a processor, a first secure code execution domain at a client device in response to one or more network communications from a server, the API installed in a web client of the client device; and
    establishing, with the API executed by the processor, a secure communication link between the first secure code execution domain of the client device and a second secure code execution domain of the server, the secure communication link to carry data read from the chip card to the second secure code execution domain of the server, the data read from the chip card by a chip card reader communicatively coupled to the client device.

2. The method of claim 1, wherein the one or more network communications from the server include one or more queries for the API.

3. The method of claim 2, further including processing the one or more queries to determine that (a) the chip card reader is communicatively coupled to the client device, and (b) the client device supports a secure enclave, the first secure code execution domain being implemented by the secure enclave.

4. The method of claim 3, wherein the secure enclave is a first secure enclave and the processing of the one or more queries is to determine that the server supports a second secure enclave, the second secure code execution domain being implemented by the second secure enclave.

5. The method of claim 1, further including accessing, within the first secure code execution domain of the client device, the data from the chip card, the data communicated by the chip card reader.

6. The method of claim 1, further including causing the data to be transmitted from the first secure code execution domain of the client device to the second secure code execution domain of the server via the secure communication link.

7. The method of claim 1, further including determining whether the chip card reader is communicatively coupled to the client device.

8. The method of claim 1, wherein the server includes at least one of an e-commerce site or a chip card processing server.

9. A client device, comprising:
    at least one processor; and
    memory to store instructions that, when executed, cause the at least one processor to execute an application programming interface (API) installed in a web client of the client device, execution of the API to cause the at least one processor to:
      create a first secure code execution domain at the client device in response to one or more network communications from a server; and
      establish a secure communication link between the first secure code execution domain of the client device and a second secure code execution domain of the server, the secure communication link to carry data of a chip card to the second secure code execution domain of the server.

10. The client device of claim 9, wherein the one or more network communications from the server include one or more queries for the API, and the execution of the API is to cause the at least one processor to determine, in response to the one or more queries, that (a) a chip card reader is communicatively coupled to the client device, and (b) the client device can support a secure enclave, the first secure code execution domain being implemented by the secure enclave.

11. The client device of claim 10, wherein the secure enclave is a first secure enclave and the execution of the API is to cause the at least one processor to determine that the server can support a second secure enclave, the second secure code execution domain being implemented by the second secure enclave.

12. The client device of claim 9, wherein the execution of the API is to cause the at least one processor to:
    access, within the first secure code execution domain, the data stored on the chip card; and
    cause the data to be transmitted, via the secure communication link, from the first secure code execution domain to the second secure code execution domain of the server.

13. The client device of claim 9, wherein the execution of the API is to cause the at least one processor to tunnel the secure communication link through another communication link.

14. A non-transitory computer-readable storage medium comprising instructions that, when executed, implement an application programming interface (API), the API, when executed, to cause a client device to at least:
    create a first secure code execution domain at the client device, the creation of the first secure code execution domain triggered by one or more network communications from a server; and establish a secure communication link between the first secure code execution domain of the client device and a second secure code execution domain of the server, the secure communication link to carry data of a chip card from the client device to the server.

15. The non-transitory computer-readable storage medium of claim 14, wherein the one or more network communications include one or more queries, and the API, when executed, is to cause the client device to determine, in response to the one or more queries, that (a) a chip card reader is communicatively coupled to the client device, and (b) the client device can support implementation of the first secure code execution domain.

16. The non-transitory computer-readable storage medium of claim 15, wherein the API, when executed, is to cause the client device to determine that the server can support implementation of the second secure code execution domain.

17. The non-transitory computer-readable storage medium of claim 14, wherein the API, when executed, is to cause the client device to:
  access, within the first secure code execution domain, the data of the chip card; and
  cause the data to be transmitted, via the secure communication link, from the first secure code execution domain to the second secure code execution domain of the server.

18. The non-transitory computer-readable storage medium of claim 14, wherein the server corresponds to an e-commerce site.

19. The non-transitory computer-readable storage medium of claim 14, wherein the server corresponds to a chip card processor.

20. The non-transitory computer-readable storage medium of claim 14, wherein the API, when executed, is to cause the client device to tunnel the secure communication link through another communication link.

\* \* \* \* \*